US 7,158,984 B2

(12) United States Patent
Fairweather

(10) Patent No.: US 7,158,984 B2
(45) Date of Patent: Jan. 2, 2007

(54) SYSTEM FOR EXCHANGING BINARY DATA

(76) Inventor: John Fairweather, 1649 Wellesley Dr., Santa Monica, CA (US) 90405

( * ) Notice: Subject to any disclaimer, the term of this patent is extended or adjusted under 35 U.S.C. 154(b) by 122 days.

(21) Appl. No.: 10/357,325

(22) Filed: Feb. 3, 2003

(65) Prior Publication Data

US 2004/0073913 A1    Apr. 15, 2004

(51) Int. Cl.
  *G06F 17/30*    (2006.01)
(52) U.S. Cl. .................... 707/101; 719/328
(58) Field of Classification Search ............... 707/100, 707/104.1, 1, 200; 709/203; 719/328; 717/103, 717/106, 108, 121
  See application file for complete search history.

(56) References Cited

U.S. PATENT DOCUMENTS 5,897,642 A *   4/1999  Capossela et al. .......... 707/203
6,591,274 B1 *  7/2003  Smith et al. ............. 707/104.1
6,883,087 B1 *  4/2005  Raynaud-Richard et al. .......................... 712/213

* cited by examiner

Primary Examiner—Greta Robinson
Assistant Examiner—Cheryl Lewis
(74) Attorney, Agent, or Firm—Merchant & Gould P.C.; Stanley J. Gradisar

(57) ABSTRACT

A strongly-typed, distributed, run-time system capable of describing and manipulating arbitrarily complex, non-flat, binary data derived from type descriptions in a standard (or slightly extended) programming language, including handling of type inheritance. The system is composed of four primary components. First, a plurality of databases having binary type and field descriptions. Second, a run-time modifiable type compiler that is capable of generating type databases either via explicit API calls or by compilation of unmodified header files or individual type definitions in a standard programming language. Third, a complete API suite for access to type information as well as full support for reading and writing types, type relationships and inheritance, and type fields, given knowledge of the unique numeric type ID and the field name/path. Finally, a hashing process for converting type names to unique type IDs (which may also incorporate a number of logical flags relating to the nature of the type). Further extensions and improvements are also provided as described herein.

19 Claims, 4 Drawing Sheets

```
typedef struct ET_Field                                 // Type Field record
{                                                       //
    ET_Hdr                      hdr;                    // Standard heap data reference fields  102
    union
    {
        ET_TypeID               typeID;                 // ID of this type
        struct
        {
            unsInt32            crc;                    // ID viewed as a pair of integers      104
            unsInt32            flags;
        } s;
    } u;
    ET_Offset /* ET_StringPtr */ fName;     // !!! ref. to name string of this field ]    106
    ET_Offset /* ET_StringPtr */ fDesc;     // !!! ref. to field description ]    108
    ET_Offset /* ET_FieldPtr */  fieldLink; // !!! ref. to next field of type ]    110
    unsInt16                    offset;     // byte offset of this field ]    112
    ET_UnitID                   unitID;     // unit ID for this field, 0 if N/A ]    114
    unsInt16                    bounds;     // for array fields, # of elements ]    116
    unsInt16                    bounds2;    // for 2*array fields, 2nd dimension ]
    118
    ET_Offset /* ET_StringPtr */ fScript;   // !!! ref. to script for this field ]    120
    ET_Offset /* ET_StringPtr */ fAnnotation;// !!! ref. to additional annotation text]    122
    int32                       flagIndex;  // flag index for this field ]124
    ET_Offset /* ET_StringPtr */ fEchoField;// !!! ref. to name of echo field (if any)]    126
    ET_TypeID                   flagIndexTypeID; // type ID for value of flag index    128
    long                        notUsed[1]; // spare
} ET_Field;                                             //
```

```
typedef struct ET_Field                                      //  Type Field record
{                                                            //
    ET_Hdr                          hdr;                     //  Standard heap data reference fields  | 102
    union
    {
        ET_TypeID                   typeID;                  //  ID of this type
        struct
        {
            unsInt32                crc;                     //  ID viewed as a pair of integers       | 104
            unsInt32                flags;
        } s;
    } u;
    ET_Offset /* ET_StringPtr */    fName;      // !!! ref. to name string of this field ]    106
    ET_Offset /* ET_StringPtr */    fDesc;      // !!! ref. to field description ]    108
    ET_Offset /* ET_FieldPtr  */    fieldLink;  // !!! ref. to next field of type ]   110
    unsInt16                        offset;     // byte offset of this field ]    112
    ET_UnitID                       unitID;     // unit ID for this field, 0 if N/A ]   114
    unsInt16                        bounds;     // for array fields, # of elements   ]   116
    unsInt16                        bounds2;    // for 2*array fields, 2nd dimension ]
    118
    ET_Offset /* ET_StringPtr */    fScript;    // !!! ref. to script for this field ]    120
    ET_Offset /* ET_StringPtr */    fAnnotation;// !!! ref. to additional annotation text]   122
    int32                           flagIndex;  // flag index for this field ]124
    ET_Offset /* ET_StringPtr */    fEchoField; // !!! ref. to name of echo field (if any)]   126
    ET_TypeID                       flagIndexTypeID; // type ID for value of flag index  | 128
    long                            notUsed[1]; // spare
} ET_Field;                                                  //
```

```
typedef struct ET_Type 1200                 // Simplex Type record
{
    ET_Hdr          hdr;                    // Standard header fields 1202
    union
    {
        ET_TypeID   typeID;                 // ID of this type 1204
        struct
        {
            unsInt32    crc;                // ID viewed as a pair of integers
            unsInt32    flags;
        } s;
    } u;
    ET_Offset /* ET_StringPtr */  name;          //!!! ref. to name of this type 1206
    ET_Offset /* ET_StringPtr */  edit;          //!!! ref. to default edit handler 1208
    ET_Offset /* ET_StringPtr */  display;       //!!! ref. to default display        ]
    ET_Offset /* ET_StringPtr */  description;   //!!! ref. to descriptive text for type 1210
    ET_Offset /* ET_TypePtr */    childLink;     //!!! ref. to next local sibling type/group 1212
    ET_Offset /* ET_StringPtr */  cTypedef;      //!!! ref. to typedef string (if present) 1216
    ET_Offset /* ET_TypePtr */    childHdr;      //!!! ref. to first child type (if local) 1218
    ET_Offset /* ET_FieldPtr */   fieldHdr;      //!!! header to list of component fields 1220
    ET_Offset /* ET_StringPtr */  keyWords;      //!!! ref. to keywords list for this type 1222
    unsInt16                      bounds;        // for array types, this is the bounds 1224
    unsInt16                      bounds2;       // for 2*array types, 2nd dimension 1226
    unsInt32                      size;          // byte size of this type (0 = computed) 1228
    unsChar                       color;         // color table entry (normally = parents) 1230
    unsInt16                      fileIndex;     // index (from 1) of defining file 1232
    OSType                        keyTypeID;     // if non-zero, key data type for this type 1234
    ET_TypeID                     childIDLink;   // ID of Next non-local sibling type 1236
    ET_TypeID                     childIDHdr;    // ID of First non-local child type 1238
    ET_TypeID                     parentID;      // ID of non-local Parent 1240
    ET_Offset /* ET_StringPtr */  tScript;       //!!! ref. to script for this type (if any) 1242
    ET_Offset /* ET_StringPtr */  tAnnotation;   //!!! ref. to additional annotation text 1244
    ET_Offset /* ET_TypePtr */    nextKeyType;   //!!! ref. to next local key data type 1246
    unsInt16                      maxFieldIndex; // maximum value of field flag index 1248
    unsInt16                      numFields;     // number of field in the type 1250
} ET_Type;
```

```
kUniversalType                    // "Universal"        ] 405
   kVoidType                      // "Void"             ] 410
   kScalarType                    // "Scalar"           ] 415
      kIntegerNumbersType         // "Integer"          ┐
         kInt8Type                // "Int8"             │
         kUnsInt8Type             // "UnsInt8"          │
            kBooleanType          // "Boolean"          │
         kInt16Type               // "Int16"            │
         kUnsInt16Type            // "UnsInt16"         │ 435
         kInt32Type               // "Int32"            │
         kUnsInt32Type            // "UnsInt32"         │
         kInt64Type               // "Int64"            │
         kUnsInt64Type            // "UnsInt64"         ┘
      kRealNumbersType            // "Real"             ┐
         kFloatType               // "Float"            │
         kShortDoubleType         // "ShortDouble"      │ 440
         kDoubleType              // "Double"           │
         kLongDoubleType          // "LongDouble"       ┘
      kStringType                 // "CString" - special cased as a scalar ┐
445
      kFileNameType               // "FileName" - special case handled explicitly
   kStructType                    // "Struct"           ] 420
   kUnionType                     // "Union"            ] 425
   kFunctionType                  // "Function"         ] 430
```

FIG. 4

SYSTEM FOR EXCHANGING BINARY DATA

CROSS REFERENCE TO RELATED APPLICATION

This application is related to the following patent applications which were filed on the same day herewith, which are owned by the same assignee of this invention, and which are incorporated herein by reference in their entirety: application Ser. No. 10/357,288 filed on Feb. 3, 2003 titled "A SYSTEM AND METHOD FOR MANAGING MEMORY," application Ser. No. 10/357,324 filed on Feb. 3, 2003 titled "A SYSTEM AND METHOD FOR PARSING DATA," and application Ser. No. 10/357,326 filed on Feb. 3, 2003 titled "SYSTEM AND METHOD FOR ANALYZING DATA."

REFERENCE TO A COMPUTER PROGRAM LISTING APPENDIX

A computer program listing appendix is submitted on two compact discs (Copy 1 and Copy 2). These discs are identical to each other. Each disc includes seven ASCII files comprising a computer program listing appendix. All material therein is hereby incorporated by reference in its entirety in this application. The names and indicated sizes of the files on the compact discs are: BasicTypes.txt (4 Kbytes), BNF.txt (8 Kbytes), FnPrototypes.txt (36 Kbytes), LEX.txt (4 Kbytes), PlugIn.txt (14 Kbytes), Resolver.txt (9 Kbytes) and TypeID.txt (3 Kbytes). These files include example source code illustrating specific implementations of specific embodiments of the invention along with explanatory text. These compact discs were created on the filing date indicated above and are in Macintosh® format.

BACKGROUND OF THE INVENTION

In most modern computer environments, such as programming languages, and applications, the programming language compiler itself performs the job of defining data structures and the types and the fields that make them up. That type information is compile-time determined. This approach has the advantage of allowing the compiler itself to detect many common programmer errors in accessing compound data structures rather than allowing such errors to occur at run-time where they are much harder to find. However, this approach is completely inadequate to the needs of a distributed and evolving system since it is impossible to ensure that the code for all nodes on the system has been compiled with a compatible set of type definitions and will therefore operate correctly. The problem is aggravated when systems from different vendors wish to exchange data and information since their type definitions are bound to be different and thus the compiler can give no help in the exchange. In recent years, technologies such as B2B suites and XML have emerged to try to facilitate the exchange of information between disparate knowledge representation systems by use of common tags, which may be used by the receiving end to identify the content of specific fields. If the receiving system does not understand the tag involved, the corresponding data may be discarded. These systems simply address the problem of converting from one 'normalized' representation to another, (i.e., how do I get it from my relational database into yours?) by use of a tagged, textual, intermediate form (e.g. XML). Such text-based markup-language approaches, while they work well for simple data objects, have major shortcomings when it comes to the interchange of complex multimedia and non-flat (i.e., having multiple cross-referenced allocations) binary data. Despite the 'buzz' associated with the latest data-interchange techniques, such systems and approaches are totally inadequate for addressing the kinds of problems faced by a system, such as an intelligence system, which attempt to monitor and capture ever-changing streams of unstructured or semi-structured inputs, from the outside world and derive knowledge, computability, and understanding from the data so gathered. The conversion of information, especially complex and multimedia information to/from a textual form such as XML becomes an unacceptable burden on complex information systems and is inadequate for describing many complex data interrelationships. This approach is the current state of the art. At a minimum, what is needed is an interchange language designed to describe and manipulate typed binary data at run-time. Ideally, this type information will be held in a 'flat' (i.e., easily transmitted) form and ideally is capable of being embedded in the data itself without impact on data integrity. The system would also ideally make use of the power of compiled strongly typed programming languages (such as C) to define arbitrarily interrelated and complex structures, while preserving the ability to use this descriptive power at run-time to interpret and create new types.

SUMMARY OF INVENTION

The present invention provides a strongly-typed, distributed, run-time system capable of describing and manipulating arbitrarily complex, non-flat, binary data derived from type descriptions in a standard (or slightly extended) programming language, including handling of type inheritance. The invention comprises four main components. First, a plurality of databases having binary type and field descriptions. The flat data-model technology (hereinafter "Claimed Database") described in application Ser. No. 10/357,288 filed on Feb. 3, 2003 titled "A SYSTEM AND METHOD FOR MANAGING MEMORY" is the preferred model for storing such information because it is capable of providing a 'flat' (i.e., single memory allocation) representation of an inherently complex and hierarchical (i.e., including type inheritance) type and field set. Second, a run-time modifiable type compiler that is capable of generating type databases either via explicit API calls or by compilation of unmodified header files or individual type definitions in a standard programming language. This function is preferably provided by the parsing technology (hereinafter "Claimed Parser") described in application Ser. No. 10/357,324 filed on Feb. 3, 2003 titled "A SYSTEM AND METHOD FOR PARSING DATA." Third, a complete API suite for access to type information as well as full support for reading and writing types, type relationships and inheritance, and type fields, given knowledge of the unique numeric type ID and the field name/path. A sample API suite is provided below. Finally, a hashing process for converting type names to unique type IDs (which may also incorporate a number of logical flags relating to the nature of the type). A sample hashing scheme is further described below.

The system of the present invention is a pre-requisite for efficient, flexible, and adaptive distributed information systems.

BRIEF DESCRIPTION OF THE DRAWINGS

FIG. 1 provides a sample implementation of the data structure ET_Field

FIG. 2 provides a sample code implementation of the data structure ET_Type;

FIG. 4 provides a sample embodiment of the logical flags that may be used to describe the typeID.

DETAILED DESCRIPTION OF THE INVENTION

Figure 3:
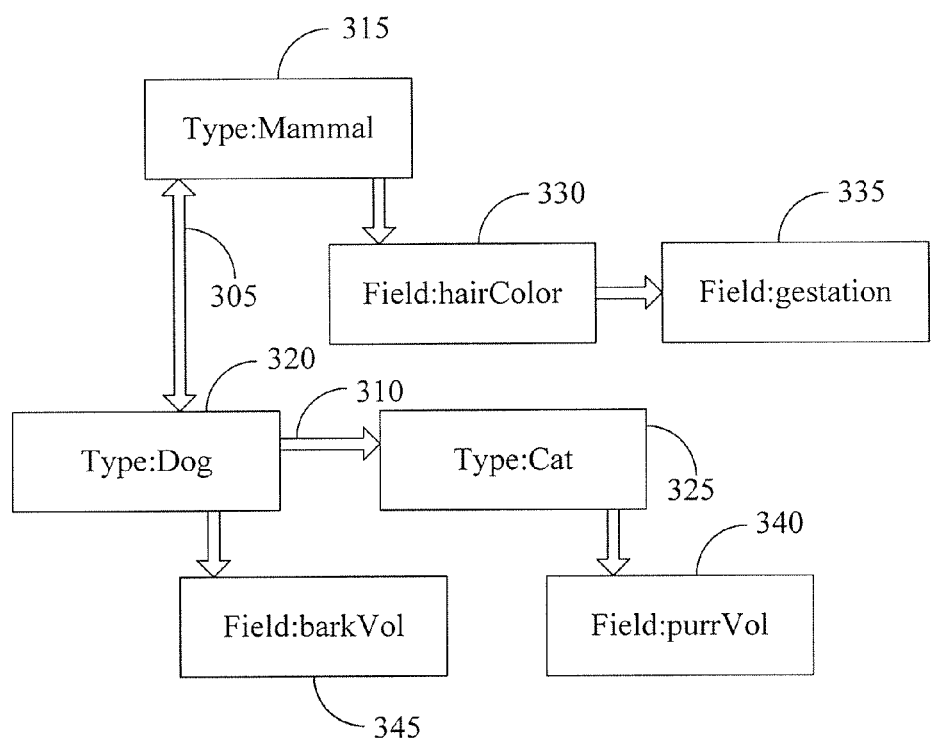
FIG. 3 is a block diagram illustrating a sample type definition tree relating ET_Type and ET_Field data structures.

The following description provides an overview of one embodiment of the invention. Please refer to the co-pending patent applications incorporated by reference in their entirety for a more complete understanding of the Claimed Parser and Claimed Database.

All type information can be encoded by using just two structure variants, these are the 'ET_Field' structure, which is used to describe the fields of a given type, and the 'ET_Type' structure, which is used to described the type itself. Referring now to FIG. 1, a sample implementation of the ET_Field structure 100 is provided. The fields in the ET_Field structure are defined and used as follows:

"hdr" 102—This is a standard header record of type ET_Hdr as defined in the Claimed Database patent application.

"typeID" 104—This field, and the union that surrounds it, contain a unique 64-bit type ID that will be utilized to rapidly identify the type of any data item. The method for computing this type ID is discussed in detail below.

"fName" 106—This field contains a relative reference to an ET_String structure specifying the name of the field.

"fDesc" 108—This field may contain a relative reference to an ET_String structure containing any descriptive text associated with the field (for example the contents of the line comments in the type definitions above).

"fieldLink" 110—This field contains a relative reference to the next field of the current type. Fields are thus organized into a link list that starts from the "fieldHDR" 220 field type and passes through successive "fieldLink" 110 links until there are no more fields.

"offset" 112—This field contains the byte offset from the start of the parent type at which the field starts. This offset provides rapid access to field values at run-time.

"unitID" 114—This field contains the unique unit ID of the field. Many fields have units (e.g., miles-per-hour) and knowledge of the units for a given field is essential when using or comparing field values.

"bounds" 116—For fields having array bounds (e.g., and array of char[80]), this field contains the first array dimension.

"bounds2" 118—For two dimensional arrays, this field contains the second dimension. This invention is particularly well-adapted for structures of a higher dimensionality than two, or where the connections between elements of a structure is more complex that simple array indexing.

"fscript" 120—Arbitrary and pre-defined actions, functions, and scripts may be associated with any field of a type. These 'scripts' are held in a formatted character string referenced via a relative reference from this field.

"fAnnotation" 122—In a manner similar to scripts, the text field referenced from this field can contain arbitrary annotations associated with the field. The use of these annotations will be discussed in later patents.

"flagIndex" 124—It is often convenient to refer to a field via a single number rather than carrying around the field name. The field index is basically a count of the field occurrence index within the parent type and serves this purpose.

"fEchoField" 126—This field is associated with forms of reference that are not relevant to this patent arid is not discussed herein.

"flagIndexTypeID" 128—In cases where a field is embedded within multiple enclosing parent types, the 'flagIndex' value stored in the field must be tagged in this manner to identify which ancestral enclosing type the index refers to.

Referring now to FIG. 2, a sample embodiment of the ET_Type structure 200 is provided. The fields of the ET_Type structure 200 are defined and used as follows:

"hdr" 202—This is a standard header record of type ET_Hdr as defined in the Claimed Database patent application.

"typeID" 204—This field, and the union that surrounds it, contain a unique 64-bit type ID that will be utilized to rapidly identify the type of any data item. The method for computing this type ID is discussed in detail below.

"name" 206—This is a relative reference to a string giving the name of the type.

"edit", "display" 208—These are relative references to strings identifying the "process" to be used to display/edit this type (if other than the default). For example the specialized process to display/edit a color might be a color-wheel dialog rather than a simple dialog allowing entry of the fields of a color (red, green, blue)

"description" 210—This is a relative reference to a string describing the type.

"ChildLink" 212—For an ancestral type from which descendant types inherit, this field gives the relative reference to the next descendant type derived from the same ancestor. Type hierarchies are defined by creating trees of derived types. The header to the list of child types at any level is the "childHdr" field 218, the link between child types is the "ChildLink" field 212. Because types are organized into multiple type databases (as discussed later), there are two forms of such links: the local form and non-local form. The non-local form is mediated by type ID references, not relative references (as for the local form), and involves the fields "childIDLink" 236, "childIDHdr" 238, and "parentID" 240 (which hold the reference from the child type to its parent). The parent reference for the local form is held in the "parent" field of "hdr" 202.

"cTypedef" 216—This field may optionally contain a relative reference to a string giving the C language type definition from which the type was created.

"childHdr" 218—This field contains the header to the list of child types at any level.

"fieldHDR" 220—Fields are organized into a link list that starts from the this field.

"keywords" 222—This field contains a relative reference to a string containing key words by which the type can be looked up.

"bounds" 224, "bounds2" 226—array dimensions as for ET_Field

"size" 228—Total size of the type in bytes.

"color" 230—To facilitate type identification in various situations, types may be assigned inheritable colors.

"fileIndex" 232—used to identify the source file from which the type was created.

"keyTypeID" 234—This field is used to indicate whether this type is designated a "key" type. In a full data-flow based system, certain types are designated 'key' types and may have servers associated with them.

"nextKeyType" 246—This field is used to link key types into a list.

"tScript" 242, "tAnnotation" 244—These fields reference type scripts and annotations as for ET_Field 100.

"maxfieldIndex" 248—This field contains the maximum field index value (see ET_Field 100) contained within the current type.

"numFields" 250—This gives the total number of fields within the current type.

To illustrate the application of these structures 100, 200 to the representation of types and the fields within them, consider the type definitions below whereby the types "Cat" and "Dog" are both descendant from the higher level type "Mammal" (denoted by the "::" symbol similar to C++ syntax).

```
type def struct Mammal
{
    RGBColor        hairColor;
    int32           gestation;       // in days
} Mammal;
typedef struct Dog::Mammal
{
    int32           barkVol;         // in decibels
} Dog;
typedef struct Cat::Mammal
{
    int32           purrVol;         // in decibels
} Cat;
```

Because they are mammals, both Cat and Dog inherit the fields "hairColor" and "gestationPeriod" which means the additional field(s) defined for each start immediately after the total of all inherited fields (from each successive ancestor). Referring now to FIG. 3, this portion of the type definition tree when viewed as a tree of related ET_Type 200 and ET_Field 100 structures is shown. In this diagram, the vertical lines 305 linking the types 315, 320 are mediated via the "childHdr" 218 and "parent" 240 links. The horizontal line 310 linking Dog 320 and Cat 325 is mediated via "ChildLink" 242. Similarly for the field links 330, 335, 340, 345 within any given type, the fields involved are "parentID" 240, "fieldHDR" 220, and "fieldLink" 110. It is thus very obvious how one would navigate through the hierarchy in order to discover say all the fields of a given type. For example, the following sample pseudo code illustrates use of recursion to first process all inherited fields before processing those unique to the type itself.

```
void LoopOverFields (ET_Type *aType)
{
    if ( aType->hdr.parent )
        LoopOverFields(aType->hdr.parent);
    for ( fieldPtr = aType->fieldHdr ; fieldPtr ; fieldPtr = fieldPtr->fieldLink )
        -- do something with the field
}
```

Given this simple tree structure in which type information is stored and accessed, it should be clear to any capable software engineer how to implement the algorithms set forth in the Applications Programming Interface (API) given below. This API illustrates the nature and scope of one set of routines that provide full control over the run-time type system of this invention. This API is intended to be illustrative of the types of capabilities provided by the system of this invention and is not intended to be exhaustive. Sample code implementing the following defined API is provided in the Computer Program Listing Appendix.

The routine TM_CruiseTypeHierarchy( ) recursively iterates through all the subtypes contained in a root type, call out to the provided callback for each type in the hierarchy. In the preferred embodiment, if the function 'callbackFunc' returns −1, this routine omits calling for any of that types sub-types.

The routine TM_Code2TypeDB( ) takes a type DB code (or TypeID value) and converts it to a handle to the types database to which it corresponds (if any). The type system of this invention allows for multiple related type databases (as described below) and this routine determines which database a given type is defined in.

TM_InitATypeDB( ) and TM_TermATypeDB( ) initialize and terminate a types database respectively. Each type DB is simply a single memory allocation utilizing a 'flat' memory model (such as the system disclosed in the claimed Database patent application) containing primarily records of ET_Type 100 and ET_Field 200 defining a set of types and their inter-relationships.

TM_SaveATypeDB( ) saves a types database to a file from which it can be re-loaded for later use.

TM_AlignedCopy( ) copies data from a packed structure in which no alignment rules are applied to a normal output structure of the same type for which the alignment rules do apply. These non-aligned structures may occur when reading from files using the type manager. Different machine architectures and compilers pack data into structures with different rules regarding the 'padding' inserted between fields. As a result, these data structures may not align on convenient boundaries for the underlying processor. For this reason, this function is used to handle these differences when passing data between dissimilar machine architecture.

TM_FixByteOrdering( ) corrects the byte ordering of a given type from the byte ordering of a 'source' machine to that of a 'target' machine (normally 0 for the current machine architecture). This capability is often necessary when reading or writing data from/to files originating from another computer system. Common byte orderings supported are as follows:

| kBigEndian | e.g., the Macintosh PowerPC |
| kLittleEndian | e.g., the Intel x86 architecture |
| kCurrentByteOrdering | current machine architecture |

TM_FindTypeDB( ) can be used to find the TypeDB handle that contains the definition of the type name specified (if any). There are multiple type DBs in the system which are accessed such that user typeDBs are consulted first, followed by system type DBs. The type DBs are accessed in the reverse order to that in which they were defined. This means that it is possible to override the definition of an existing type by defining a new one in a later types DB. Normally the containing typeDB can be deduced from the type ID alone (which contains an embedded DB index), however, in cases where only the name is known, this function deduces the corresponding DB. This routine returns the handle to containing type DB or NULL if not found. This invention allows for a number of distinct type DBs to co-exist so that types coming from different sources or relating to different functional areas may be self contained. In the preferred embodiment, these type DBs are identified by the letters of the alphabet ('A' to 'Z') yielding a maximum of 26 fixed type databases. In addition, temporary type databases (any number) can be defined and accessed from within a given process context and used to hold local or temporary types that are unique to that context. All type DBs are connected together via a linked list and types from any later database may reference or derive from types in an earlier database (the converse is not true). Certain of these type DBs may be pre-defined to have specialized meanings. A preferred list of type DBs that have specialized meanings as follows:

'A'—built-in types and platform Toolbox header files
'B'—GUI framework and environment header files
'C'—Project specific header files
'D'—Flat data-model structure old-versions DB (allows automatic adaptation to type changes)
'E'—Reserved for 'proxy' types
'F'—Reserved for internal dynamic use by the environment
'I'—Project specific ontology types TM_GetTypeID( ) retrieves a type's ID Number when given its name. If aTypeName is valid, the type ID is returned, otherwise 0 is returned and an error is reported.

TM_IsKnownTypeName( ) is almost identical but does not report an error if the specified type name cannot be found.

TM_ComputeTypeBaseID( ) computes the 32-bit unique type base ID for a given type name, returning it in the most significant 32-bit word of a 64-bit ET_TypeID 104. The base ID is calculated by hashing the type name and should thus be unique to all practical purposes. The full typeID is a 64-bit quantity where the base ID as calculated by this routine forms the most significant 32 bits while a variety of logical flags describing the type occupy the least significant 32-bits. In order to ensure that there is a minimal probability of two different names mapping onto the same type ID, the hash function chosen in the preferred embodiment is the 32-bit CRC used as the frame check sequence in ADCCP (ANSI X3.66, also known as FIPS PUB 71 and FED-STD-1003, the U.S. versions of CCITT's X.25 link-level protocol) but with the bit order reversed. The FIPS PUB 78 states that the 32-bit FCS reduces hash collisions by a factor of $10^-5$ over the 16-bit FCS. Any other suitable hashing scheme, however, could be used. The approach allows type names to be rapidly and uniquely converted to the corresponding type ID by the system. This is an important feature if type information is to be reliably shared across a network by different machines. The key point is that by knowledge of the type name alone, a unique numeric type ID can be formed which can then be efficiently used to access information about the type, its fields, and its ancestry. The other 32 bits of a complete 64-bit type ID are utilized to contain logical flags concerning the exact nature of the type and are provided in the Computer Program Listing Appendix.

Given these type flag definitions and knowledge of the hashing algorithm involved, it is possible to define constants for the various built-in types (i.e., those directly supported by the underlying platform from which all other compound types can be defined by accumulation). A sample list of constants for the various built in types is provided in the Computer Program Listing Appendix.

Assuming that the constant definitions set forth in the Computer Program Listing Appendix are used, it is clear that the very top of the type hierarchy, the built-in types (from which all other types eventually derive), are similar to that exposed by the C language.

Referring now to FIG. 4, a diagrammatic representation of a built-in type is shown (where indentation implies a descendant type). Within the kUniversalType 405, the set of direct descendants includes kVoidType 410, kScalarType 415, kStructType 420, kUnionType 425, and kFunctionType 430. kScalarType also includes descendants for handling integers 435, descendants for handling real numbers 440 and descendants for handling special case scalar values 445. Again, this illustrates only one embodiment of built-in types that may be utilized by the present system.

The following description provides a detailed summary of some of the functions that may be used in conjunction with the present invention. This list is not meant to be exhaustive nor or many of these functions required (depending upon the functionality required for a given implementation). The pseudo code associated with these functions is further illustrated in the Computer Program Listing Appendix. It will be obvious to those skilled in the art how these functions could be implemented in code.

Returning now to the Computer Program Listing Appendix, a function TM_CleanFieldName( ) is defined which provides a standardized way of converting field names within a type into human readable labels that can be displayed in a UI. By choosing suitable field names for types, the system can create "human readable" labels in the corresponding UT. The conversion algorithm can be implemented as follows:

1) Convert underscores to spaces, capitalizing any letter that immediately follows the underscore
2) Capitalize the first letter
3) Insert a space in front of every capitalized letter that immediately follows a lower case letter
4) Capitalize any letter that immediately follows a '.' character (field path delimiter)
5) De-capitalize the first letter of any of the following filler words (unless they start the sentence):
"an", "and", "of", "the", "or" "to", "is", "as", "a"

So for example:
"aFieldName" would become "A Field Name" as would "a_field_name"
"timeOfDay" would become "Time of Day" as would "time_of_day"

A function, such as TM_AbbreveFieldName( ), could be used to provide a standardized way of converting field names within a type into abbreviated forms that are still (mostly) recognizable. Again, choosing suitable field names for types ensures both human readable labels in the corresponding UI as well as readable abbreviations for other purposes (such as generating database table names in an external relational database system). The conversion algorithm is as follows:

1) The first letter is copied over and capitalized.
2) For all subsequent letters:
   a) If the letter is a capital, copy it over and any 'numLowerCase' lower case letters that immediately follow it.
   b) If the letter follows a space or an underscore, copy it over and capitalize it
   c) If the letter is'.', '[', or ']', convert it (and any immediately subsequent letters in this set) to a single '_' character, capitalize the next letter (if any). This behavior allows this function to handle field paths.
   d) otherwise discard it So for example:
"aFieldName" would become "AFiNa" as would "a_field_name" if 'numLowerCase' was 1, and it would be 'AFieNam' if it were 2

"timeOfDay" would become "TiOfDa" as would "time of day" if 'numLowerCase' was 1, and it would be 'TimOfDay' if it were 2

For a field path example:

"geog.city[3].population" would become "Ge_Ci_3_Po" if 'numLowerCase' was

Wrapper functions, such as TM_SetTypeEdit( ), TM_SetTypeDisplay( ), TM_SetTypeConverter( ), TM_SetTypeCtypedef( ), TM_SetTypeKeyWords( ), TM_SetTypeDescription( ), and TM_SetTypeColor( ), may be used set the corresponding field of the ET_Type structure 200. The corresponding 'get' functions are simply wrapper functions to get the same field.

A function, TM_SetTypeIcon( ), may be provided that sets the color icon ID associated with the type (if specified). It is often useful for UI purposes to associate an identifiable icon with particular types (e.g., a type of occupation), this icon can be specified using TM_SetTypeIcon( ) or as part of the normal acquisition process. Auto-generated UI (and many other UI context) may use such icons to aid in UI clarity. Icons can also be inherited from ancestral types so that it is only necessary to specify an icon if the derived type has a sufficiently different meaning semantically in a UI context. The function TM_GetTypeIcon( ) returns the icons associated with a type (if any).

A function, such as TM_SetTypeKeyType( ), may be used to associate a key data type (see TM_GetTypeKeyType) with a type manager type. By making this association, it is possible to utilize the full suite of behaviors supported for external APIs such as Database and Client-Server APIs, including creation and communication with server(s) of that type, symbolic invocation, etc. For integration with external APIs, another routine, such as TM_KeyTypeToTypeID( ), may be used to obtain the type manager type ID corresponding to a given key data type. If there is no corresponding type ID, this routine returns zero.

Another function, TM_GetTypeName( ), may be used to get a type's name given the type ID number. In the preferred embodiment, this function returns using the 'aTypeName' parameter, the name of the type.

A function, such as TM_FindTypesByKeyword( ), may be used to search for all type DBs (available from the context in which it is called) to find types that contain the keywords specified in the 'aKeywordList' parameter. If matches are found, the function can allocate and return a handle to an array of type IDs in the 'theIDList' parameter and a count of the number of elements in this array as it's result. If the function result is zero, 'theIDList' is not allocated.

The function TM_GetTypeFileName( ) gets the name of the header file in which a type was defined (if any).

Given a type ID, a function, such as TM_GetParentTypeID( ), can be used to get the ID of the parent type. If the given ID has no parent, an ID of 0 will be returned. If an error occurs, a value of −1 will be returned.

Another function, such as TM_IsTypeDescendant( ), may be used to determine if one type is the same as or a descendant of another. The TM_IsTypeDescendant( ) call could be used to check only direct lineage whereas TM_AreTypesCompatible( ) checks lineage and other factors in determining compatibility. If the source is a descendant of, or the same as, the target, TRUE is returned, otherwise FALSE is returned.

Another set of functions, hereinafter referred to as TM_TypeIsPointer( ), TM_TypeIsHandle( ), TM_TypeIsRelRef( ) TM_TypeIsCollectionRef( ), TM_TypeIsPersistentRef( ), may be used to determine if a typeID represents a pointer/handle/relative etc. reference to memory or the memory contents itself (see typeID flag definitions). The routines optionally return the typeID of the base type that is referenced if the type ID does represent a pointer/handle/ref. In the preferred embodiment, when calling TM_TypeIsPtr( ), a type ID that is a handle will return FALSE so the determination of whether the type is a handle, using a function such as TM_TypeIsHandle( ), could be checked first where both possibilities may occur. The function TM_TypeIsReference( ) will return true if the type is any kind of reference. This function could also return the particular reference type via a parameter, such as the 'refType' parameter.

Another function, such as TM_TypesAreCompatible( ), may be used to check if the source type is the same as, or a descendant of, the target type. In the preferred embodiment, this routine returns:

+1 If the source type is a descendant of the target type (a legal connection)

−1 If the source type is a group type (no size) and the target is descended from it (also a legal connection)

0 Otherwise (an illegal connection)

If the source type is a 'grouping' type (e.g., Scalar), i.e., it has no size then this routine will return compatible if either the source is ancestral to the target or vice-versa. This allows for data flow connections that are typed using a group to be connected to flows that are more restricted.

Additional functions, such as TM_GetTypeSize( ) and TM_SizeOf( ), could be applied in order to return the size of the specified data type. For example, TM_GetTypeSize( ) could be provided with an optional data handle which may be used to, determine the size of variable sized types (e.g., strings). Either the size of the type could be returned or, alternatively, a ( ) could be returned for an error. TM_SizeOf( ) could be provided with a similar optional data pointer. It also could return the size of the type or 0 for an error.

A function, such as TM_GetTypeBounds( ), could be programmed to return the array bounds of an array type. If the type is not an array type, this function could return a FALSE indicator instead.

The function TM_GetArrayTypeElementOffset( ) can be used to access the individual elements of an array type. Note that this is distinct from accessing the elements an array field. If a type is an array type, the parent type is the type of the element of that array. This knowledge can be used to allow assignment or access to the array elements through the type manager API.

The function TM_InitMem( ) initializes an existing block of memory for a type. The memory will be set to zero except for any fields which have values which will be initialized to the appropriate default (either via annotation or script calls—not discussed herein). The function TM_NewPtr( ) allocates and initializes a heap data pointer. If you wish to allocate a larger amount of memory than the type would imply, you may specify a non-zero value for the 'size' parameter. The value passed should be TM_GetTypeSize ( . . . )+ the extra memory required. If a type ends in a variable sized array parameter, this will be necessary in order to ensure the correct allocation. The function TM_NewHdl( ) performs a similar function for a heap data handle. The functions TM_DisposePtr( ) and TM_DisposeHdl( ) may be used to de-allocate memory allocated in this manner.

The function TM_LocalFieldPath( ) can be used to truncate a field path to that portion that lies within the specified enclosing type. Normally field paths would inherently satisfy this condition, however, there are situations where a field path implicitly follows a reference. This path truncation behavior is performed internally for most field related calls. This function should be used prior to such calls if the possibility of a non-local field path exists in order to avoid confusion. For example:

```
typedef struct t1
{
    char  x[;1'6];
} t1;
typedef struct t2
{
    t1  y;
} t2;
then TM__LocalFieldPath(,t2,"y.x[3]",) would yield the string "y".
```

Given a type ID, and a field within that type, TM_GetFieldTypeID( ) will return the type ID of the aforementioned field or 0 in the case of an error.

The function TM_GetBuiltInAncestor( ) returns the first built-in direct (i.e., not via a reference) ancestor of the type ID given.

Two functions, hereinafter called TM_GetIntegerValue( ) and TM_GetRealValue( ), could be used to obtain integer and real values in a standardized form. In the preferred embodiment, if the specified type is, or can be converted to, an integer value, the TM_GetIntegerValue( ) would return that value as the largest integer type (i.e., int64). If the specified type is, or can be converted to, a real value, TM_GetRealValue( ) would return that value the largest real type (i.e., long double). This is useful when code does not want to be concerned with the actual integer or real variant used by the type or field. Additional functions, such as TM_SetIntegerValue( ) and TM_SetRealValue( ), could perform the same function in the opposite direction.

Given a type ID, and a field within that type, a function, hereinafter called TM_GetFieldContainerTypeID( ), could be used to return the container type ID of the aforementioned field or 0 in the case of an error. Normally the container type ID of a field is identical to 'aTypeID', however, in the case where a type inherits fields from other ancestral types, the field specified may actually be contributed by one of those ancestors and in this case, the type ID returned will be some ancestor of 'aTypeID'. In the preferred embodiment, if a field path is specified via 'aFieldName' (e.g., field1.field2) then the container type ID returned would correspond to the immediate ancestor of 'field2', that is 'field1'. Often these inner structures are anonymous types that the type manager creates during the types acquisition process.

A function, hereinafter called TM_GetFieldSize( ), returns the size, in bytes, of a field, given the field name and the field's enclosing type; ( ) is returned if unsuccessful.

A function, hereinafter called TM_IsLegalFieldPath( ), determines if a string could be a legal field path, i.e., does not contain any characters that could not be part of a field path. This check does not mean that the path actually is valid for a given type, simply that it could be. This function operates by rejecting any string that contains characters that are not either alphanumeric or in the set '[',']','_', or '.'. Spaces are allowed only between '[' and ']'.

Given an enclosing type ID, a field name, and a handle to the data, a function, hereinafter known as TM_GetFieldValueH( ), could be used to copy the field data referenced by the handle into a new handle. In the preferred embodiment, it will return the handle storing the copy of the field data. If the field is an array of 'char', this call would append a terminating null byte. That is if a field is "char[4]" then at least a 5 byte buffer must be allocated in order to hold the result. This approach greatly simplifies C string handling since returned strings are guaranteed to be properly terminated. A function, such as TM_GetFieldValueP( ), could serve as the pointer based equivalent. Additionally, a function such as TM_SetFieldValue( ) could be used to set a field value given a type ID, a field name and a binary object. It would also return an error code in an error.

A function, such as TM_SetCStringFieldValue( ), could be used to set the C string field of a field within the specified type. This function could transparently handle logic for the various allowable C-string fields as follows:
1) if the field is a charHdl then:
   a) if the field already contains a value, update/grow the existing handle to hold the new value
   b) otherwise allocate a handle and assign it to the field
2) if the field is a charPtr then:
   a) if the field already contains a value:
      i) if the previous string is equal to or longer than the new one, copy new string into existing pointer
      ii) otherwise dispose of previous pointer, allocate a new one and assign it
   b) otherwise allocate a pointer and assign it to the field
3) if the field is a relative reference then:
   a) this should be considered an error. A pointer value could be assigned to such a field prior to moving the data into a collection in which case you should use a function similar to the TM_SetFieldValue( ) function described above.
4) if the field is an array of char then:
   a) if the new value does not fit, report array bounds error
   b) otherwise copy the value into the array A function, such as TM_AssignToField( ), could be used to assign a simple field to a value expressed as a C string. For example, the target field could be:
   a) Any form of string field or string reference;
   b) A persistent or collection reference to another type; or
   c) Any other direct simple or structure field type. In this case the format of the C string given should be compatible with a call to TM_StringToBinary( ) (described above) for the field type involved. The delimiter for TM StringToBinary( ) is taken to be "," and the 'kCharArrayAsString' option (see TM_BinaryToString) is assumed.

In the preferred embodiment, the assignment logic used by this routine (when the 'kAppendStringValue' is present) would result in existing string fields having new values appended to the end of them rather than being overwritten. This is in contrast to the behavior of TM_SetCStringFieldValue( ) described above. For non-string fields, any values specified overwrite the previous field content with the exception of assignment to the 'aStringH' field of a collection or persistent reference with is appended if the 'kAppendStringValue' option is present. If the field being assigned is a collection reference and the 'kAppendStringValue' option is set, the contents of 'aStringPtr' could be appended to the contents of a string field. If the field being assigned is a persistent reference, the 'kAssignToRefType', 'kAssignToUniqueID' or 'kAssignToStringH' would be used to determine if the typeID, unique ID, or 'aStringH' field of the reference is assigned. Otherwise the assignment is to the name field. In the case of 'kAssignToRefType', the string could be assumed to be a valid type name which is first converted to a type ID. If the field is a relative reference (assumed to be a string), the contents of 'aStringPtr' could be assigned to it as a (internally allocated) heap pointer.

Given an enclosing type ID, a field name, and a pointer to the data, a function such as TM_SetArrFieldValue( ) could be used to copy the data referenced by the pointer into an element of an array field element into the buffer supplied. Array fields may have one, or two dimensions.

Functions, hereinafter named TM_GetCStringFieldValueB( ), TM_GetCStringFieldValueP( ) and TM_GetCStringFieldValueH( ), could be used to get a C string field from a type into a buffer/pointer/handle. In the case of a buffer, the buffer supplied must be large enough to contain the field contents returned. In other cases the function or program making the call must dispose of the memory returned when no longer required. In the preferred embodiment, this function will return any string field contents regardless of how is actually stored in the type structure, that is the field value may be in an array, via a pointer, or via a handle, it will be returned in the memory supplied. If the field type is not appropriate for a C string, this function could optionally return FALSE and provide an empty output buffer.

Given an enclosing type ID, a field name, and a pointer to the data, the system should also include a function, hereinafter name TM_GetArrFieldValueP ( ), that will copy an element of an array field element's data referenced by the pointer into the buffer supplied. Array fields may have one, or two dimensions.

Simple wrapper functions, hereinafter named TM_GetFieldBounds( ), TM_GetFieldOffset( ), TM_GetField Units( ), and TM_GetFieldDescription( ), could be provided in order to access the corresponding field in ET_Field 100. Corresponding 'set' functions (which are similar) could also be provided.

The function TM_ForAllFieldsLoop( ) is also provided that will iterate through all fields (and sub-fields) of a type invoking the specified procedure. This behavior is commonplace in a number of situations involving scanning the fields of a type. In the preferred embodiment, the scanning process should adhere to a common approach and as a result a function, such as this one, should be used for that purpose. A field action function takes the following form:

reflected in the 'fieldPath' parameter, the appropriate element specific value in 'fieldOffset', and ( ) for both dimension 1 and dimension 2.

This choice of behavior for array fields offers the simplest functional interface to the action function. Options are:
  kRecursiveLoop—If set, recurses through sub-fields, otherwise one-level only
  kDataPtrIsViewRef—The 'aDataPtr' is the address of an ET_ViewRef designating a collection element A function, hereinafter referred to as TM_FieldNameExists( ), could be used to determine if a field with the given name is in the given type, or any of the type's ancestral types. If the field is found return it returns TRUE, otherwise it returns FALSE.

A function, hereinafter referred to as TM_GetNumberOfFields( ), may be used to return the number of fields in a given structured type or a −1 in the case of an error. In the preferred embodiment, this number is the number of direct fields within the type, if the type contains sub-structures, the fields of these sub-structures are not counted towards the total returned by this function. One could use another function, such as TM_ForAllFieldsLoop( ), to count fields regardless of level with 'kRecursiveLoop' set true and a counting function passed for 'aFieldFn' (see TM_GetTypeMaxFlagIndex).

Another function, referred to as TM_GetFieldFlagIndex( ), can provide the 'flag index' for a given field within a type. The flag index of a field is defined to be that field's index in the series of calls that are made by the function TM_ForAllFieldsLoop( ) (described above) before it encounters the exact path specified. This index can be utilized as an index into some means of storing information or flags specific to that field within the type. In the preferred embodiment, these indices include any field or type arrays that may be within the type. This function may also be used internally by a number of collection flag based APIs but may also be used by external code for similar purposes. In the event that TM_ForAllFieldsLoop( ) calls back for the enclosing structure field before it calls back for the fields

```
Boolean myActionFn   (                          // my field action function
        ET_TypeDBHd1  aTypeDBHd1,               // I: Type DB (NULL to default)
        ET_TypeID 104 aTypeID,                  // I: The type ID
        ET_TypeID 104 aContainingTypeID,        // I: containing Type ID of field
        anonPtr       aDataPtr,                 // I: The type data pointer
        anonPtr       context,                  // IO:Use to pass custom context
        charPtr       fieldPath,                // I:Field path for field
        ET_TypeID 104 aFieldTypeID,             // I:Type ID for field
        int32         dimension1,               // I:Field array bounds 1 (0 if
N/A)
        int32         dimension2,               // I:Field array bounds 2 (0 if
N/A)
        int32         fieldOffset,              // I:Offset of start of field
        int32         options,                  // I:Options flags
        anonPtr       internalUseOnly           // I:For internal use only
                      )                         // R:TRUE for success
```

In this example, fields are processed in the order they occur, sub-field calls (if appropriate) occur after the containing field call. If this function encounters an array field (1 or 2 dimensional), it behaves as follows:
  a) The action function is first called once for the entire field with no field indexing specified in the path.
  b) If the element type of the array is a structure (not a union), the action function will be invoked recursively for each element with the appropriate element index(es)

within this enclosing structure, the index may be somewhat larger than the count of the 'elementary' fields within the type. Additionally, because field flag indices can be easily converted to/from the corresponding field path (see TM_FlagIndexToFieldPath), they may be a useful way of referring to a specific field in a variety of circumstances that would make maintaining the field path more cumbersome. Supporting functions include the following: TM_FieldOffsetToFlagIndex( ) is a function that converts a field offset to the corresponding flag index within a type; TM_FlagIndexToFieldPath( ) is a function that converts a flag index to the corresponding field path within a type; and the function TM_GetTypeMaxFlagIndex( ) returns the maximum possible value that will be returned by TM_GetFieldFlagIndex( ) for a given type. This can be used for example to allocate memory for flag storage.

Another function, referred to as TM_FieldNamesToIndeces( ), converts a comma separated list of field names/paths to the corresponding zero terminated list of field indices. It is often the case that the 'fieldNames' list references fields within the structure that is actually referenced from a field within the structure identified by 'aTypeID'. In this case, the index recorded in the index list will be of the referencing field, the remainder of the path is ignored. For this reason, it is possible that duplicate field indices might be implied by the list of 'fieldNames' and as a result, this routine can also be programmed to automatically eliminate duplicates.

A function, hereinafter name TM_GetTypeProxy( ), could be used to obtain a proxy type that can be used within collections in place of the full persistent type record and which contains a limited subset of the fields of the original type. While TM_GetTypeProxy( ) could take a list of field indices, the function TM_MakeTypeProxyFromFields( ) could be used to take a comma separated field list. Otherwise, both functions would be identical. Proxy types are all descendant of the type ET_Hit and thus the first few fields are identical to those of ET_Hit. By using these fields, it is possible to determine the original persistent value to which the proxy refers. The use of proxies enables large collections and lists to be built up and fetched from servers without the need to fetch all the corresponding data, and without the memory requirements implied by use of the referenced type(s). In the preferred embodiment, proxy types are formed and used dynamically. This approach provides a key advantage of the type system of this invention and is crucial to efficient operation of complex distributed systems. Proxy types are temporary, that is, although they become known throughout the application as soon as they are defined using this function, they exist only for the duration of a given run of the application. Preferably, proxy types are actually created into type database 'E' which is reserved for that purpose (see above). Multiple proxies may also be defined for the same type having different index lists. In such a case, if a matching proxy already exists in 'E', it is used. A proxy type can also be used in place of the actual type in almost all situations, and can be rapidly resolved to obtain any additional fields of the original type. In one embodiment, proxy type names are of the form:

typeName_Proxy_n

Where the (hex) value of 'n' is a computed function of the field index list.

Another function that may be provided as part of the API, hereinafter called TM_MakeTypeProxyFromFilter( ), can be used to make a proxy type that can be used within collections in place of the full persistent type record and which contains a limited subset of the fields of the original type. Preferably, the fields contained in the proxy are those allowed by the filter function, which examines ALL fields of the full type and returns TRUE to include the field in the proxy or FALSE to exclude the field. For more information concerning proxy types, see the discussion for the function TM_MakeTypeProxyFromFields( ). The only difference between this function and the function TM_MakeTypeProxyFromFields( ) is that TM_MakeTypeProxyFromFields( ) expects a comma separated field list as a parameter instead of a filter function. Another function, TM_IsTypeProxy( ), could be used to determine if a given type is a proxy type and if so, what original persistent type it is a proxy for. Note that proxy type values start with the fields of ET_Hit and so both the unique ID and the type ID being referenced may be obtained more accurately from the value. The type ID returned by this function may be ancestral to the actual type ID contained within the proxy value itself. The type ET_Hit may be used to return data item lists from servers in a form that allows them to be uniquely identified (via the system and _id fields) so that the full (or proxy) value can be obtained from the server later. ET_Hit is defined as follows:

| typedef struct ET_Hit | | // list of query hits returned by a server |
|---|---|---|
| { | | |
| OSType | _system; | // system tag |
| unsInt64 | _id; | // local unique item ID |
| ET_TypeID 104 | _type; | // type ID |
| int32 | _relevance; | // relevance value 0 . . . 100 |
| } ET_Hit; | | |

The function TM_GetNthFieldType( ) gets the type of the Nth field in a structure. TM_GetNthFieldName( ) obtains the corresponding field name and TM_GetNthFieldOffset( ) the corresponding field offset.

Another function that may be included within the API toolset is a function called TM_GetTypeChildren( ). This function produces a list of type IDs of the children of the given type. This function allocates a zero terminated array of ET_TypeID 104's and returns the address of the array in 'aChildIDList'; the type ID's are written into this array. If 'aChildIDList' is specified as NULL then this array is not allocated and the function merely counts the number of children; otherwise 'aChildIDList' must be the address of a pointer that will point at the typeID array on exit. A negative number is returned in the case of an error. In the preferred embodiment, various specialized options for omitting certain classes of child types are supported.

A function, hereinafter referred to as TM_GetTypeAncestors( ), may also be provided that produces a list of type IDs of ancestors of the given type. This function allocates a zero terminated array of ET TypeID 104 and returns the address of the array in 'ancestralIDs'; the type ID's are written into this array. If 'ancestralIDs' is specified as NULL then this array is not allocated and the function merely counts the number of ancestors; otherwise 'ancestralIDs' must be the address of a pointer that will point at the typeID array on exit. The last item in the list is a 0, the penultimate item is the primal ancestor of the given type, and the first item in the list is the immediate predecessor, or parent, of the given type. The function TM_GetTypeAncestorPath( ) produces a ':' separated type path from a given ancestor to a descendant type. The path returned is exclusive of the type name but inclusive of the descendant, empty if the two are the same or 'ancestorID' is not an ancestor or 'aTypeID'. The function TM_GetInheritanceChain( ) is very similar to TM_GetTypeAncestors( ) with the following exceptions:

(1) the array of ancestor type ids returned is in reverse order with the primal ancestor being in element 0.

(2) the base type from which the list of ancestors is determined is included in the array and is the next to last element (array is 0 terminated)

(3) the count of the number of ancestors includes the base type

In the preferred embodiment, this function allocates a zero terminated array of ET_TypeID 104's and returns the address of the array in 'inheritanceChainIDs'; the type ID's are written into this array. If 'inheritanceChainIDs' is specified as NULL then this array is not allocated and the function merely counts the number of types in the inheritance chain; otherwise 'inheritanceChainIDs' must be the address of a pointer that will point at the typeID array on exit. The last item in the list is 0, element 0 is the primal ancestor of the base type, and the next to last item in the list is, the base type.

The API could also include a function, hereinafter called TM_GetTypeDescendants( ), that is able to create a tree collection whose root node is the type specified and whose branch and leaf nodes are the descendant types of the root. Each node in the tree is named by the type name and none of the nodes contain any data. Collections of derived types can serve as useful frameworks onto which various instances of that type can be 'hung' or alternatively as a navigation and/or browsing framework. The resultant collection can be walked using the collections API (discussed in a later patent). The function TM_GetTypeSiblings( ) produces a list of type IDs of sibling types of the given type. This function allocates a zero terminated array of ET_TypeID 104's and returns the address of the array in 'aListOSibs', the type ID's are written into this array. If 'aListOSibs' is specified as NULL then this array is not allocated and the function merely counts the number of siblings; otherwise 'ancestraIIDs' must be the address of a pointer that will point at the typeID array on exit. The type whose siblings we wish to find is NOT included in the returned list. The function TM_GetNthChildTypeID( ) gets the n'th child Type ID for the passed in parent. The function returns 0 if successful, otherwise it returns an error code.

The function TM_BinaryToString( ) converts the contents of a typed binary value into a C string containing one field per delimited section. During conversion, each field in turn is converted to the equivalent ASCII string and appended to the entire string with the specified delimiter sequence. If no delimiter is specified, a new-line character is used. The handle, 'aStringHdl', need not be empty on entry to this routine in which case the output of this routine is appended to whatever is already in the handle. If the type contains a variable sized array as its last field (i.e., stuff[ ]), it is important that 'aDataPtr' be a true heap allocated pointer since the pointer size itself will be used to determine the actual dimensions of the array. In the preferred embodiment, the following specialized options are also available:

| | |
|---|---|
| kUnsignedAsHex | display unsigned numbers as hex |
| kCharArrayAsString | display char arrays as C strings |
| kShowFieldNames | prefix all values by fieldName: |
| kOneLevelDeepOnly | Do Not go down to evaluate sub-structures: |

An additional function, hereinafter referred to as TM_StringToBinary( ), may also be provided in order to convert the contents of a C string of the format created by TM_BinaryToString( ) into the equivalent binary value in memory.

The API may also support calls to a function, hereinafter referred to as TM_LowestCommonAncestor( ), which obtains the lowest common ancestor type ID for the two type IDs specified. If either type ID is zero, the other type ID is returned. In the event that one type is ancestral to the other, it is most efficient to pass it as the 'typeID2' parameter.

Finally, a function, referred to as TM_DefineNewType( ), is disclosed that may be used to define a new type to be added to the specified types database by parsing the C type definition supplied in the string parameter. In the preferred embodiment, the C syntax typedef string is preserved in its entirety and attached to the type definition created so that it may be subsequently recalled. If no parent type ID is supplied, the newly created type is descended directly from the appropriate group type (e.g., structure, integer, real, union etc.) the typedef supplied must specify the entire structure of the type (i.e., all fields). If a parent type ID is supplied, the new type is created as a descendant of that type and the typedef supplied specifies only those fields that are additional to the parental type, NOT the entire type. This function is the key to how new types can be defined and incorporated into the type system at run time and for that reason is a critical algorithm to the present invention. The implementation is based on the parser technology described in application Ser. No. 10/357,324 filed on Feb. 3, 2003 titled "A SYSTEM AND METHOD FOR PARSING DATA," (the "Claimed Parser") and the lexical analyzer technology (the "Claimed Lexical Analyzer") as disclosed in application Ser. No. 10/357,326 filed on Feb. 3, 2003 titled "SYSTEM AND METHOD FOR ANALYZING DATA." As set forth above, those pending applications are fully incorporated herein. The reader is referred to those applications (as well as the Claimed Database patent application) for additional details. The BNF specification to create the necessary types parser (which interprets an extended form of the C language declaration syntax) is provided in the Computer Program Listing Appendix. The corresponding lexical analyzer specification is also provided in the Computer Program Listing Appendix.

As can be seen from the specifications in the Computer Program Listing Appendix, the types acquisition parser is designed to be able to interpret any construct expressible in the C programming language but has been extended to support additional features. The language symbols associated with these extensions to C are as follows:

| | |
|---|---|
| script | used to associate a script with a type or field |
| annotation | used to associate an annotation with a type or field |
| @ | relative reference designator (like '*' for a pointer) |
| @@ | collection reference designator |
| # | persistent reference designator |
| <on> | script and annotation block start delimiter |
| <no> | script and annotation block end delimiter |
| >< | echo field specification operator |

In order to complete the types acquisition process, a 'resolver' function and at least one plug-in are provided. A pseudo code embodiment of one possible resolver is set forth in the Computer Program Listing Appendix. Since most of the necessary C language operations are already provided by the built-in parser plug-in zero, the only extension of this solution necessary for this application is the plug-in functionality unique to the type parsing problem itself. This will be referred to as plug-in one and the pseudo code for such a plug in is also provided in the Computer Program Listing Appendix.

The foregoing description of the preferred embodiments of the invention has been presented for the purposes of illustration and description. For example, although described with respect to the C programming language, any programming language could be used to implement this invention. Additionally, the claimed system and method should not be limited to the particular API disclosed. The descriptions of the header structures should also not be limited to the embodiments described. While the sample pseudo code provides examples of the code that may be used, the plurality of implementations that could in fact be developed is nearly limitless. For these reasons, this description is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A system for describing and manipulating arbitrarily complex non-flat binary data, said arbitrarily complex non-flat binary data containing references between distinct structures and derived from type descriptions, the system comprising:
    a processor;
    logically connected to said processor, one or more custom binary type and field description databases, wherein said one or more custom binary type and field description databases provide type descriptions and field descriptions, accessible at run-time, for the purposes of manipulating the arbitrarily complex non-flat binary data, wherein said one or more custom binary type and field description databases define the set of known binary type structures and structure fields derived by compilation or interpretation of type definitions expressed in a standard textual source code form as structure descriptions, together with an enumeration and definition of component fields of said structure descriptions, including one or more fields mediating inter-structure references;
    logically connected to the processor, a compiler, wherein said compiler is capable of accessing said one or more custom binary type and field description databases at run-time and generating or modifying said one or more custom binary type and field description databases;
    logically connected to said processor, an application program interface suite, wherein said application program interface suite provides full support for reading and writing information from said one or more custom binary type and field description databases; and
    logically connected to said processor, a hashing process, wherein said hashing process converts type names to unique numeric type IDs.

2. The system of claim 1, wherein said processor comprises two or more processors.

3. The system of claim 2, wherein said two or more processors are distributed across a computer network.

4. The system of claim 1, wherein said one or more custom binary type and field description databases are represented by a flat data model, wherein said flat data model utilizes a memory type that creates both a handle as well as a reference to an item within said handle.

5. The system of claim 1, wherein said compiler is capable of generating said one or more custom binary type and field description databases using explicit application program interface calls provided by said application program interface suite.

6. The system of claim 1, wherein said compiler is capable of generating said one or more custom binary type and field description databases by compilation of unmodified header files.

7. The system of claim 1, wherein said compiler is capable of generating said one or more custom binary type and field description databases by compilation of individual type definitions.

8. The system of claim 1, wherein said compiler is based upon a parser, wherein said parser communicates with a resolver and has an application program interface permitting use of one or more plug-ins capable of interpreting embedded reverse-polish operators.

9. The system of claim 8, wherein said compiler is based upon a lexical analyzer having a first table describing single transitions, and a second table describing range transitions, and a first phase of analysis that utilizes said first table, and a second phase of analysis that utilizes said second table.

10. The system of claim 1, wherein the type descriptions stored in said one or more custom binary type and field description databases are described using the C programming language.

11. The system of claim 1, wherein said type descriptions and said field descriptions of said one or more custom binary type and field description databases have at least one of the following types of information associated with them: descriptive text; field units; named executable scripts; named annotation records; custom display, edit, and other handler processes; type-converter processes; key words; coloring and icons; and data links to external server links and functions.

12. The system of claim 1, wherein said hashing process involves computing a cyclic redundancy check of said type names.

13. The system of claim 1, wherein said application program interface suite includes an ability to allocate, initialize, de-allocate, and cross-reference heap memory model structures of any given type, and access type relationships and inheritance, and type fields, given knowledge of said unique numeric type IDs and a field name/path.

14. The system of claim 1, wherein said application program interface suite includes the ability to allocate, initialize, de-allocate, and cross-reference flat data model structures of any given type.

15. The system of claim 1, wherein said application program interface suite includes the ability to automatically re-map the byte ordering and field packing of complex binary structures based on that utilized by an underlying processor architecture.

16. The system of claim 1, wherein said application program interface suite includes the ability to convert between an arbitrarily complex binary type and a corresponding textual description.

17. The system of claim 1, further comprising a system for creating a proxy type in place of a full type, wherein said proxy type contains a subset of the fields of said full type such that said proxy type is transparently interchangeable with said full type for a given application.

18. The system of claim 1 wherein any given field within a parent type can be assigned a unique field index that can be used interchangeably with a field name/path.

19. The system of claim 1 wherein said type IDs created by said hashing process further incorporate a number of logical flags relating to a nature of said type.

* * * * *

UNITED STATES PATENT AND TRADEMARK OFFICE
CERTIFICATE OF CORRECTION

PATENT NO. : 7,158,984 B2  Page 1 of 1
APPLICATION NO. : 10/357325
DATED : January 2, 2007
INVENTOR(S) : John Fairweather It is certified that error appears in the above-identified patent and that said Letters Patent is hereby corrected as shown below:

Column 19,
line 55, Delete the word "type" and replace with the word -- tuple --.

Signed and Sealed this

Twenty-seventh Day of March, 2007

JON W. DUDAS
*Director of the United States Patent and Trademark Office*